US012026852B2

(12) United States Patent
Holt

(10) Patent No.: US 12,026,852 B2
(45) Date of Patent: Jul. 2, 2024

(54) INSTRUMENT QUALIFIED VISUAL RANGE (IQVR) IMAGE PROCESSING ARTIFACT MITIGATION

(71) Applicant: KERR AVIONICS LLC, West Linn, OR (US)

(72) Inventor: Jordan Holt, Portland, OR (US)

(73) Assignee: Kerr Avionics LLC, West Linn, OR (US)

( * ) Notice: Subject to any disclaimer, the term of this patent is extended or adjusted under 35 U.S.C. 154(b) by 394 days.

(21) Appl. No.: 17/621,863

(22) PCT Filed: Jun. 25, 2020

(86) PCT No.: PCT/US2020/039689
§ 371 (c)(1),
(2) Date: Dec. 22, 2021

(87) PCT Pub. No.: WO2020/264212
PCT Pub. Date: Dec. 30, 2020

(65) Prior Publication Data
US 2022/0237757 A1   Jul. 28, 2022

(51) Int. Cl.
G06K 9/00   (2022.01)
G06T 5/50   (2006.01)
G06T 7/246  (2017.01)
G06V 10/60  (2022.01)
H04N 23/81  (2023.01)

(52) U.S. Cl.
CPC .............. G06T 5/50 (2013.01); G06T 7/248 (2017.01); G06V 10/60 (2022.01); H04N 23/81 (2023.01); *G06T 2207/10016* (2013.01); *G06T 2207/10032* (2013.01); *G06T 2207/20224* (2013.01)

(58) Field of Classification Search
CPC . G06T 5/50; G06T 7/248; G06T 2207/10016; G06T 2207/10032; G06T 2207/20224; G06T 2207/20221; G06V 10/60; H04N 23/81; H04N 5/145
See application file for complete search history.

(56) References Cited

U.S. PATENT DOCUMENTS

| | | | |
|---|---|---|---|
| 8,811,769 B1 * | 8/2014 | Pitts ....................... | H04N 13/00 382/275 |
| 2004/0080623 A1 | 4/2004 | Cleveland et al. | |
| 2009/0009596 A1 | 1/2009 | Kerr et al. | |
| 2011/0134223 A1 | 6/2011 | Zomet et al. | |
| 2014/0119651 A1 | 5/2014 | Meyers et al. | |

(Continued)

FOREIGN PATENT DOCUMENTS

| | | | | |
|---|---|---|---|---|
| CN | 102741883 A * | 10/2012 | ............. | G06T 11/00 |
| WO | WO-2013175982 A1 * | 11/2013 | ............. | A61B 6/481 |
| WO | 2020264212 A1 | 12/2020 | | |

OTHER PUBLICATIONS

International Search Report and Written Opinion for International Application No. PCT/US2020/039689, mailed Sep. 14, 2020, 9 pages.

(Continued)

*Primary Examiner* — Xin Jia
(74) *Attorney, Agent, or Firm* — Stoel Rives LLP

(57) ABSTRACT

Disclosed are techniques for image processing that mitigate artifacts that otherwise appear when an IQVR camera moves with respect to a scene between image frames.

19 Claims, 4 Drawing Sheets

(56) References Cited

U.S. PATENT DOCUMENTS

2015/0271383 A1* 9/2015 Bienvenu .................. G06T 5/70
 382/167
2017/0301095 A1* 10/2017 Zhang ....................... G06T 5/10

OTHER PUBLICATIONS

Punchihewa, et al.: "Artefacts in image and video systems; classification and mitigation", Proceedings of image and vision computing New Zealand, 2002, 6 pages.
Satterthwaite, et al.: "Motion artifact in studies of functional connectivity: Characteristics and mitigation strategies", Human Brain Mapping vol. 40, No. 7, Nov. 1, 2017, 19 pages.

* cited by examiner

INSTRUMENT QUALIFIED VISUAL RANGE (IQVR) IMAGE PROCESSING ARTIFACT MITIGATION

RELATED APPLICATION

This application is a National Stage of International Application No. PCT/US2020/039689, filed Jun. 25, 2020, which claims priority benefit of U.S. Provisional Patent Application No. 62/866,164 filed Jun. 25, 2019, all of which are hereby incorporated by reference in their entireties.

TECHNICAL FIELD

This disclosure relates to instrument qualified visual range (IQVR) systems and, more particularly, to image processing techniques for mitigation of visual artifacts.

BACKGROUND INFORMATION

U.S. Pat. Nos. RE44,604 and RE45,452 of Kerr et al. describe, among other things, a system for and a method of synchronous acquisition of pulsed source light for monitoring of an aircraft flight operation. Diode sources of illumination are synchronized with and pulsed at one-half the video frame rate of an imaging camera. In some embodiments, synchronization timing signals for modulating the target-light(s) pulsing and the camera frame rate are derived from inexpensive GPS receivers on the ground and the aircraft equipment.

Alternate image frames capture views of the scene with lights of interest pulsed on, and then off, repeatedly. When the camera is generally stationary with respect to the scene, video differencing (a subtraction made between pixel values at common pixel locations of two successive video frames in a sequence—one frame with the target light on and the next one with it off) eliminates the background scene, as well as all lights not of interest, resulting in a signal-to-noise advantage for detection of the target light. This technique is known by such terms as synchronous or coherent detection.

Suitable thresholding over a resulting array of camera pixel-differences facilitates acquisition of the desired lights so as to represent them as point symbology on a display, such as a head-up display (HUD). In an enhanced vision (landing) system (also referred to as an EVS) embodiment, the desired lights (symbols) overlie, or are fused on, a thermal image of the scene. In other embodiments, the symbols overlie a visible scene (TV) image.

The FAA has dubbed the aforementioned technology as instrument qualified visual range (IQVR). IQVR (also referred to as synchronous detection) is essentially a runway visual range (RVR) for an EVS and video-camera equipped aircraft that enables a pilot to see, and the primary flight display or HUD to show, the touchdown (i.e., landing) zone (TDZ) 30% to 50% sooner than would be possible for an unaided human or an EVS sensor alone to detect.

SUMMARY OF THE DISCLOSURE

The present disclosure describes techniques to mitigate artifacts observed in conventional IQVR systems.

Additional aspects and advantages will be apparent from the following detailed description of embodiments, which proceeds with reference to the accompanying drawings.

DETAILED DESCRIPTION OF EMBODIMENTS

Figure 1:
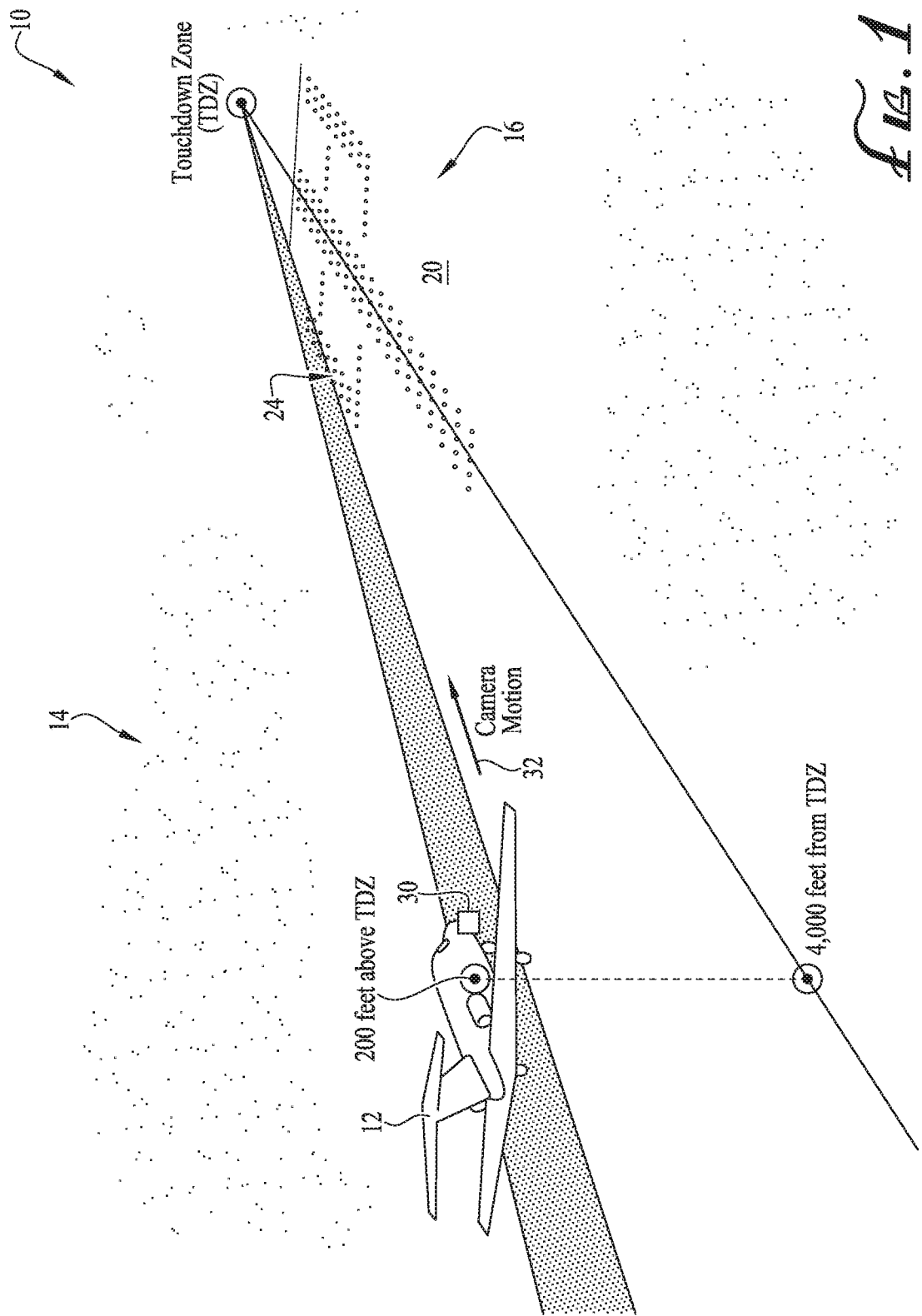
FIG. 1 is a perspective view of an aircraft approaching an illuminated runway and carrying a camera system operating in synchronism with flashing LED runway lights to perform image processing techniques described herein.

FIG. 1 shows an IQVR system 10 including an aircraft 12 traveling through fog 14 while approaching an illuminated section 16 of a runway 20. Illuminated section 16 is lit by pulsed LED lights 24 for detection by a synchronized camera system 30 including a visible or infrared image sensor, as described in the '604 and '452 patents of Kerr et al. Accordingly, aircraft 12 carries camera system 30 providing an air-based IQVR system to capture successive image frames while moving 32 toward LED lights 24. IQVR system 10 may optionally carry image processing computing devices and displays described later with reference to FIG. 4.

Movement 32, especially at high speeds or relatively low frames per second, introduces visual artifacts when successive image frames are subtracted using conventional techniques. For example, in a conventional IQVR system, motion between a camera system and the background scene causes artifacts (i.e., so-called ghost outlines) when subtracting two successive video frames because the movement of scene features between the frames generates non-zero values after subtraction, as described later with reference to FIG. 2. Thus, ghost phenomena confuse a target tracker attempting to acquire and track IQVR targets in the images.

Figure 2:
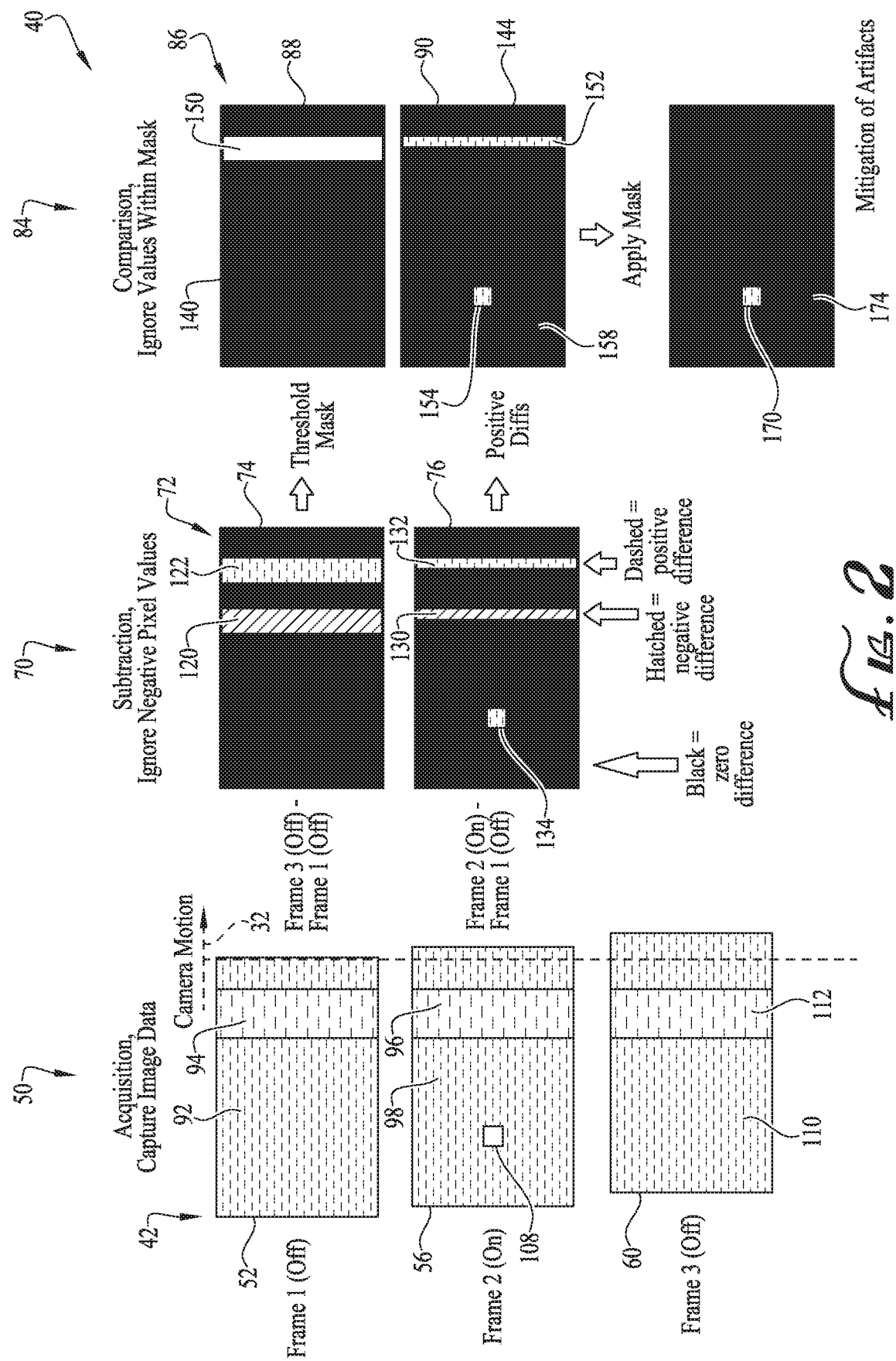
FIG. 2 is an annotated, hypothetical pictorial view showing how three successive image frames produced from the camera system of FIG. 1 (i.e., which is moving relative to an IQVR target scene) are processed to prepare a mask for removing visual artifacts while emphasizing an IQVR target light illuminated in the second image frame.

FIG. 2 shows a pictorial representation of a process 40 for removing visual artifacts that would otherwise be present when a conventional IQVR system attempts to analyze three successive image frames 42 acquired by a camera system, according to one embodiment. The processing operations are generally represented by image frames arranged in three columns, although skilled persons will appreciate in light of this disclosure that processing operations may be performed on image data (i.e., data structures or virtual image frames) stored in memory. Nevertheless, for ease of description, corresponding frames of FIG. 2 should be appreciated as providing a visual framework by which 8-bit grayscale intensity values are represented in a range from zero (black) to 255 (white). In other embodiments, image data has another number of bits, is in color, is a portion or region of a frame, or is in another form.

On the left-hand side of FIG. 2, a first column 50 shows three successive image frames 42, with a first image frame 52 toward the top of first column 50, a second image frame 56 in the middle, and a third image frame 60 at the bottom. A second, middle column 70 shows two subtraction results 72 shown in the form of a first subtraction image frame 74 and a second subtraction image frame 76 that visually represent results of subtraction operations performed on pairs of image frames from first column 50. Finally, on the right-hand side of FIG. 2, a third column 84 shows negative values from two subtraction results 72, in which the negative values are changed to zero to generate results 86. A first result 88 is a mask applied to a second result 90 so as to mitigate visual artifacts.

Negative values generated during subtraction are shown as hatched lines. Furthermore, negative and positive values may be inverted such that if a light is on, the light produced a low value in the image (e.g., black). Because the terms "negative" and "positive" are relative to the IQVR differencing and range of pixel values, this disclosure also uses "out-of-range" for negative, overflow, or otherwise inverted values; and "in-range" for positive values. In this example of FIG. 2, the "range" refers to a range of permissible pixel values (e.g., 0-255).

In first column 50, first image frame 52 includes a background 92 that is light gray in color. A contrasting area, shown as a darker gray band 94, is also present.

Second image frame 56 shows similar details, but because camera system 30 (FIG. 1) has moved along direction of motion 32, the details in second image frame 56 are shifted, relative to first image frame 52, in a direction opposite the direction motion 32. Accordingly, a darker gray band 96 is more toward the center of a background 98 in second image frame 56. Also, an IQVR target light, which flashes at half the frame rate, is shown as a white rectangle 108.

In third image frame 60, the IQVR target light is off again and similar details of first image frame 52 (i.e., a light gray background 110 and a darker gray band 112) are shown as being shifted slightly more toward the left due to additional motion 32.

In middle column 70, first subtraction image frame 74 shows the result of a subtraction of first image frame 52 from third image frame 60. Most pixel values are zero (shown as black), although there is a small band 120 of negative values representing results of subtraction of a portion of lighter gray background 92 of first image frame 52 from darker gray band 112 of third image frame 60. Likewise, a band of positive values 122 represents results of subtraction of a portion of darker gray band 94 of first image frame 52 from light gray background 110 of third image frame 60.

A similar subtraction process is performed to generate second subtraction image frame 76 representing first image frame 52 subtracted from second image frame 56. A small band 130 and a light gray band 132 are narrower, however, because there is a smaller amount of motion 32 that occurs between the times at which first and second image frames 52, 56 are captured compared to first and third image frames 52, 60. As explained later, bands 130 and 132 are so-called ghost outlines observed in conventional IQVR processing and removed by the disclosed processing techniques. Lastly, a gray rectangle 134 represents the positive difference where the IQVR target is on in frame 56 and off in frame 52.

As explained later, other logic or mathematical operations may be used in lieu of subtraction to achieve similar results shown in middle column 70. Likewise, the negative and positive values shown in FIG. 2 correspond to the operation of the IQVR target light in one particular example sequence. Thus, because the light is on in second image frame 56, a positive difference is shown in second subtraction image frame 76. But if IQVR is differencing off_frame–on_frame instead, then the positive/negative regions would be reversed.

In third column 84, negative values (i.e., bands 120 and 130) are removed from subtraction image frames 74 and 76 to generate, respectively, a mask frame 140 representing a mask and an artifact frame 144 to which mask frame 140 is applied. Specifically, negative values are changed to zeros, which leaves a band 150 in mask frame 140, and an artifact band 152 (i.e., same as band 132) and a rectangle 154 (i.e., same as rectangle 134) in artifact frame 144. In the present embodiment, positive values of mask frame 140 are also changed to maximum positive values (e.g., 255, which represents the color white), but other desired values are possible. Accordingly, band 150 is white to represent positive values 122 of subtraction image frame 74, but other values are possible.

Band 150 may have gradients or smooth transitional intensity distributions in various directions across the mask, depending on the desired configuration and input data. The term threshold, therefore, may refer to a hard threshold of a specific value, e.g., if the difference is more than 50, then it exceeds a hard mask. It may also refer to a soft mask which can operate like a scaling factor or a subtraction or some other non-linear function to achieve a masking effect.

Third column 84 also shows that, to apply mask frame 140, it is subtracted from artifact frame 144. A resulting frame (not shown) includes negative values resulting from the subtraction of white band 150 from a black background 158 and band 152. These negative values are ignored (e.g., changed to zero) to generate a final detection frame 160 in which artifact band 152 is removed and a rectangle 170 (representing IQVR target light of white rectangle 108) remains and clearly contrasts with black background 174.

Skilled persons will appreciate that there are other ways (aside from subtract and ignore) that a mask can be applied. For example, pixels in artifact frame 144 can be multiplied by corresponding logical values generated using the following function: (max−values of mask frame 140)/max, where "max" is 255 in the present example. This function converts band 150 to zero so that when it is multiplied to artifact band 152, values in band 152 also become zero. Likewise, the function converts black values of mask frame 140 to one so that they do not change artifact frame 144 after multiplication. Converting mask frame 140 to logical values (zero and one) can also be used to perform logic operations (i.e., logical AND) on artifact frame 144 to remove band 152. In another embodiment, mask frame 140 or portions thereof are scaled up or down by a gain factor, which could include a non-linear gain (e.g., a sigmoid where low values are scaled down to by a factor of 0.0, mid values have high gain, and high values are scaled up by a factor of 1.0).

Figure 3:
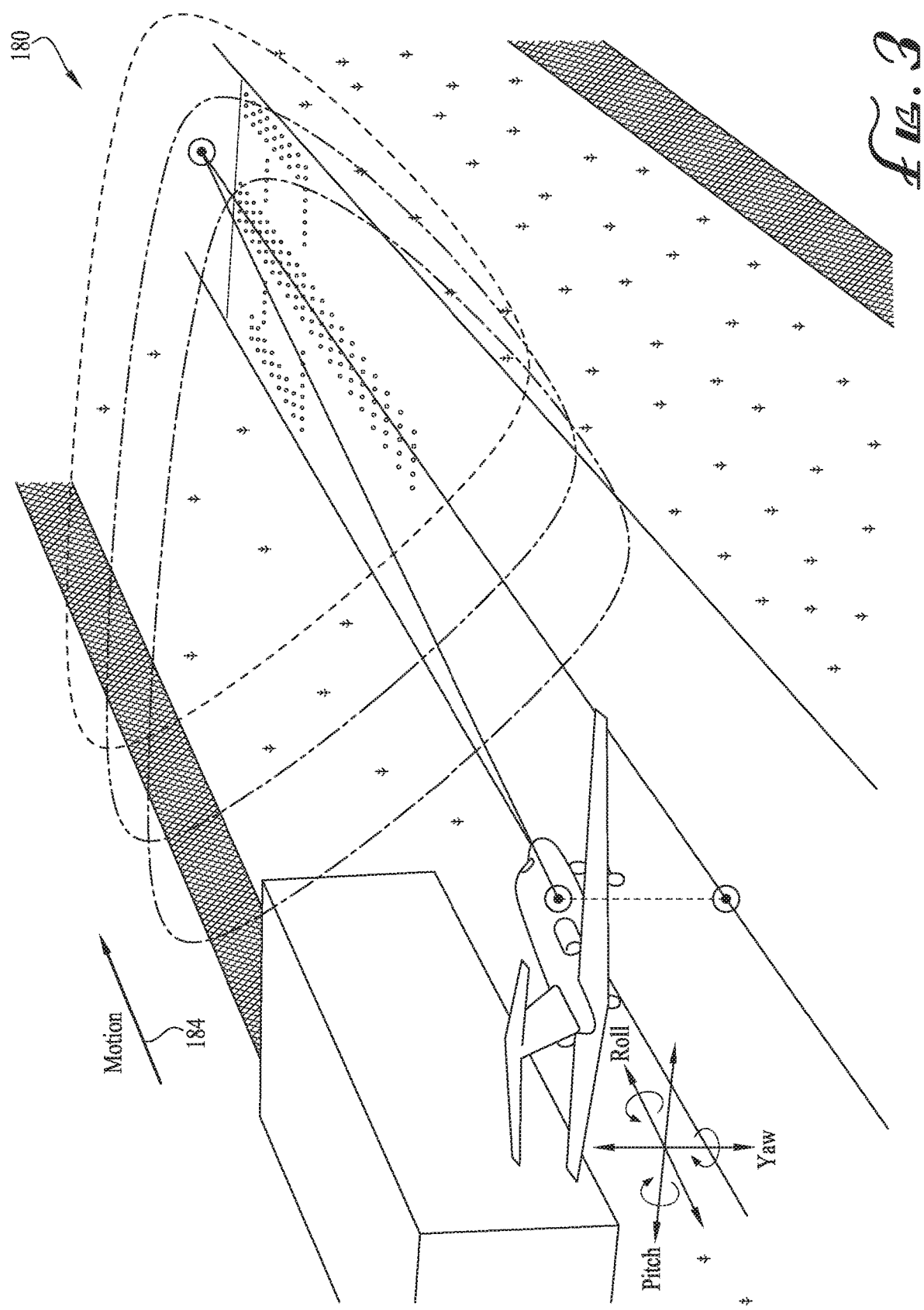
FIG. 3 is another perspective view showing an arbitrary shape of pixel data and a multi-component direction of motion.

The aforementioned bands and rectangles are simple, intuitive features shown in FIG. 2 for the purpose of describing process 40 along a single direction of motion 32. Skilled persons will now appreciate, however, that the various features and directions of motion are not limited to the specific examples of this disclosure. For example, FIG. 3 shows another example including an arbitrary shape 180 of image data and a multi-component direction of motion 184 including random vibrations. Motion 184 can be introduced to a camera system from pitch/roll/yaw, in addition to or separate from translational movements.

Figure 4:
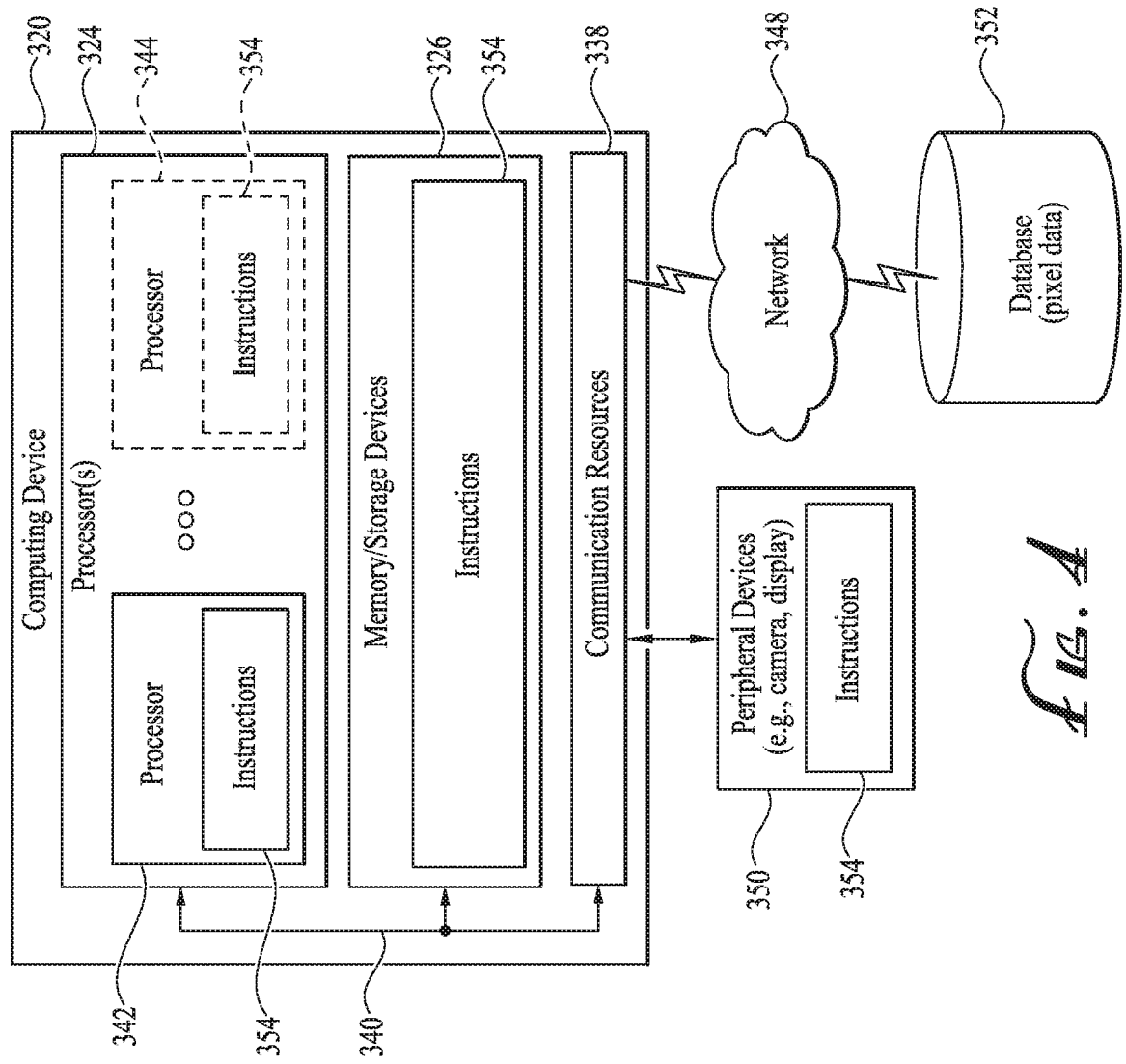
FIG. 4 is a block diagram of a computing device configured to perform the disclosed image processing techniques, according to one embodiment.

Embodiments described herein may be implemented in any suitably configured hardware and software resources of an image processing computing device 320, as shown in FIG. 4. And various aspects of certain embodiments may be implemented using hardware, software, firmware, or a combination thereof, for reading instructions from a machine- or computer-readable non-transitory storage medium and thereby performing one or more of the methods realizing the disclosed algorithms and techniques. Specifically, computing device 320 includes one or more processors 324, one or more memory/storage devices 326, and one or more communication resources 338, all of which are communicatively coupled via a bus or other circuitry 340.

Processor(s) 324, may include, for example, a processor 342 (shared, dedicated, or group), an optional processor (or additional processor core) 344, an ASIC or other controller to execute one or more software or firmware programs, a combinational logic circuit, or other suitable components that provide the described functionality including parallel processing of lines of data.

Memory/storage devices 326 may include main memory, cache, flash storage, or any suitable combination thereof. A memory device 326 may also include any combination of various levels of non-transitory machine-readable memory including, but not limited to, electrically erasable programmable read-only memory (EEPROM) having embedded software instructions (e.g., firmware), dynamic random-access memory (e.g., DRAM), cache, buffers, or other memory devices. In some embodiments, memory may be shared among the various processors or dedicated to particular processors.

Communication resources 338 include physical and network interface components or other suitable devices to communicate via a network 348 with one or more peripheral devices 350 (e.g., programming workstation) or one or more other devices collectively storing data 352, such as image frames of other forms of pixel data. Communication resources 338 may also include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 354 may comprise software, a program, an application, an applet, an app, or other executable code for causing at least any of processor(s) 324 to perform any one or more of the methods discussed herein. For example, instructions 354 facilitate receiving (e.g., via communication resources 338) a data from various data sources for processing. Instructions 354, for example, include .Net and C libraries providing machine-readable instructions that, when executed by a processor, cause processors of to perform preparing a method of processing image frames to mitigate artifacts in an IQVR system.

Instructions 354 may reside, completely or partially, within at least one of processor(s) 324 (e.g., within a processor's cache memory), memory/storage devices 326, or any suitable combination thereof. Furthermore, any portion of instructions 354 may be transferred to computing device 320 from any combination of peripheral devices 350 or the other devices storing data. Accordingly, memory of processors(s) 324, memory/storage devices 326, peripheral devices 350, and the other devices are examples of computer-readable and machine-readable media.

Instructions 354 may also, for instance, comprise one or more physical or logical blocks of computer instructions, which may be organized as a routine, program, object, component, data structure, text file, or other instruction set facilitating one or more tasks or implementing particular data structures or software modules. A software module, component, or library may include any type of computer instruction or computer-executable code located within or on a non-transitory computer-readable storage medium. In certain embodiments, a particular software module, component, or programmable rule may comprise disparate instructions stored in different locations of a computer-readable storage medium, which together implement the described functionality. Indeed, a software module, component, or programmable rule may comprise a single instruction or many instructions, and may be distributed over several different code segments, among different programs, and across several computer-readable storage media. Some embodiments may be practiced in a distributed computing environment where tasks are performed by a remote processing device linked through a communications network.

Skilled persons will appreciate that many changes may be made to the details of the above-described embodiments without departing from the underlying principles of the invention. For example, image processing computing device 320 may be deployed in aircraft 12 or implemented in a ground-based workstation. Ground-to-ground use cases include navigating a truck, boat, or spacecraft. The scope of the present invention should, therefore, be determined only by the following claims.

The invention claimed is:

1. An image-processing method of mitigating a ghost image artifact attributable to relative motion of imaged features represented in consecutive images captured from an aircraft-borne or a ground-based synchronous detection system configured to capture an image sequence, the image sequence including first, second, and third image data, the method comprising:

generating first difference image data as a first difference between the third and first image data, the first difference image data corresponding to the relative motion between the third and first image data, the first difference image data including a first out-of-range region having first out-of-range data values and a first in-range region having first in-range data values;

adjusting the first out-of-range and in-range data values to form, respectively, first and second mask regions;

generating second difference image data as a second difference between the second and first image data, the second difference image data corresponding to the relative motion between the second and first image data, the second difference image data including a second out-of-range region having second out-of-range data values and a second in-range region having second in-range data values, the second out-of-range and in-range data values representing the ghost image artifact; and mitigating the ghost image artifact by adjusting the second out-of-range data values and applying the second mask region to the second in-range data values.

2. The method of claim 1 in which the first and second out-of-range data values are negative values.

3. The method of claim 1 in which the first and second in-range data values are positive values.

4. The method of claim 1 in which the first, second, and third image data are sequential image frames.

5. The method of claim 1 in which a pulsed LED in a landing zone is depicted in the second image data.

6. The method of claim 1 in which a pulsed LED on an aircraft is depicted in the second image data.

7. The method of claim 1 in which the generating the first difference image data comprises subtracting the first image data from the third image data.

8. The method of claim 1 in which the generating the second difference image data comprises subtracting the first image data from the second image data.

9. The method of claim 1 in which the adjusting the first out-of-range data values comprises setting negative values to a value representing a minimum pixel intensity.

10. The method of claim 1 in which the adjusting the first in-range data values comprises setting positive values to a value representing a maximum pixel intensity.

11. The method of claim 1 further comprising scaling one or both the first and second mask regions.

12. A machine-readable medium having instructions stored thereon that, when executed by a processor of an image-processing computing device configured to mitigate a ghost image artifact attributable to relative motion of imaged features represented in consecutive first, second, and third image data captured from an aircraft-borne or a ground-based synchronous detection system, configure the processor to:
generate first difference image data as a first difference between the third and first image data, the first difference image data corresponding to the relative motion between the third and first image data, the first difference image data including a first out-of-range region having first out-of-range data values and a first in-range region having first in-range data values;
adjust the first out-of-range and in-range data values to form, respectively, first and second mask regions;
generate second difference image data as a second difference between the second and first image data, the second difference image data corresponding to the relative motion between the second and first image data, the second difference image data including a second out-of-range region having second out-of-range data values and a second in-range region having second in-range data values, the second out-of-range and in-range data values representing the ghost image artifact; and
mitigate the ghost image artifact by adjusting the second out-of-range data values and applying the second mask region to the second in-range data values.

13. The machine-readable medium of claim 12 in which the first and second out-of-range data values are negative values.

14. The machine-readable medium of claim 12 in which the first and second in-range data values are positive values.

15. The machine-readable medium of claim 12 in which the first, second, and third image data are sequential image frames.

16. The machine-readable medium of claim 12 in which a pulsed LED in a landing zone is depicted in the second image data.

17. The machine-readable medium of claim 12 in which a pulsed LED on an aircraft is depicted in the second image data.

18. The machine-readable medium of claim 12 in which the instructions further configure the processor to subtract the first image data from the third image data to generate the first difference image data to generate the first difference image data.

19. The machine-readable medium of claim 12 in which the instructions further configure the processor to subtract the first image data from the second image data to generate the second difference image data.

* * * * *